Inventor
Jorgen I. Haase

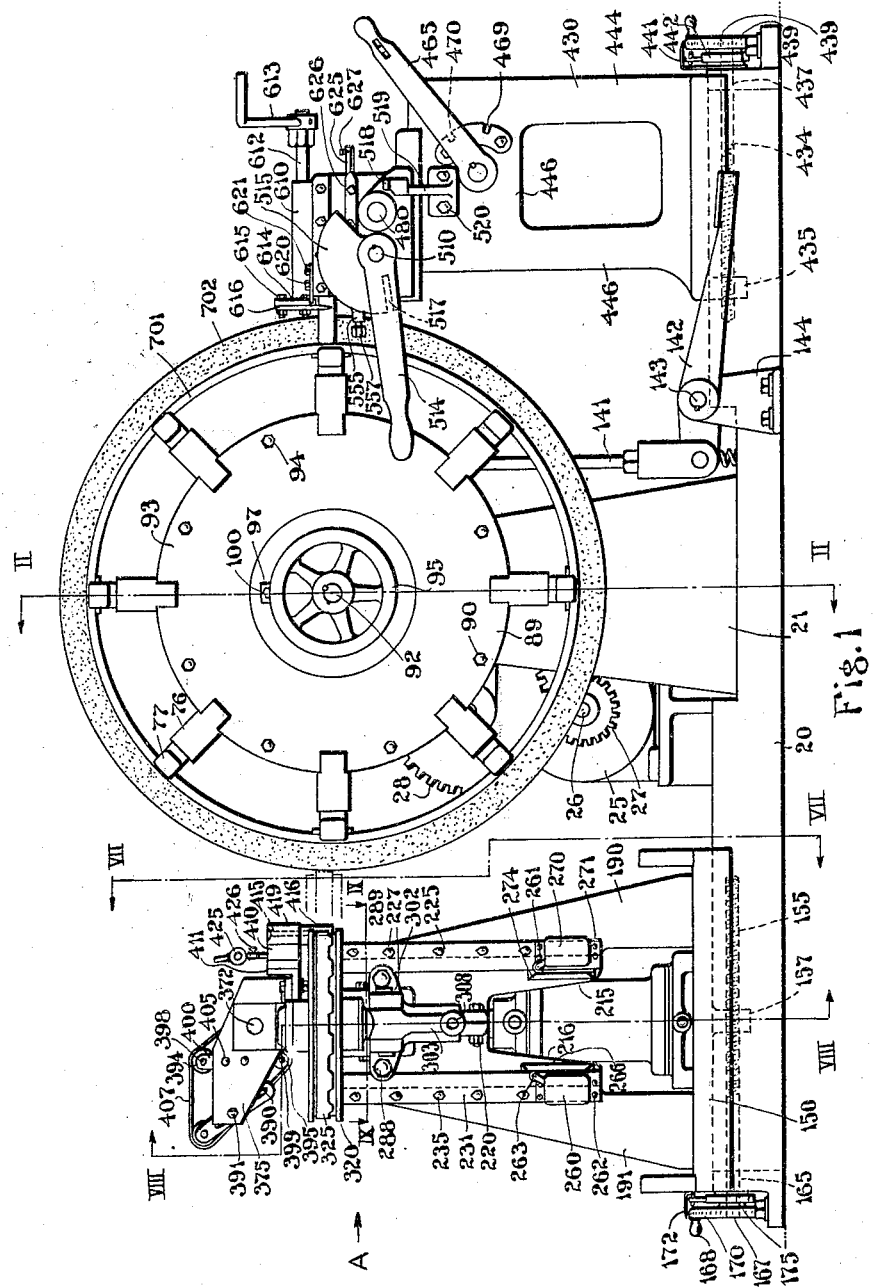

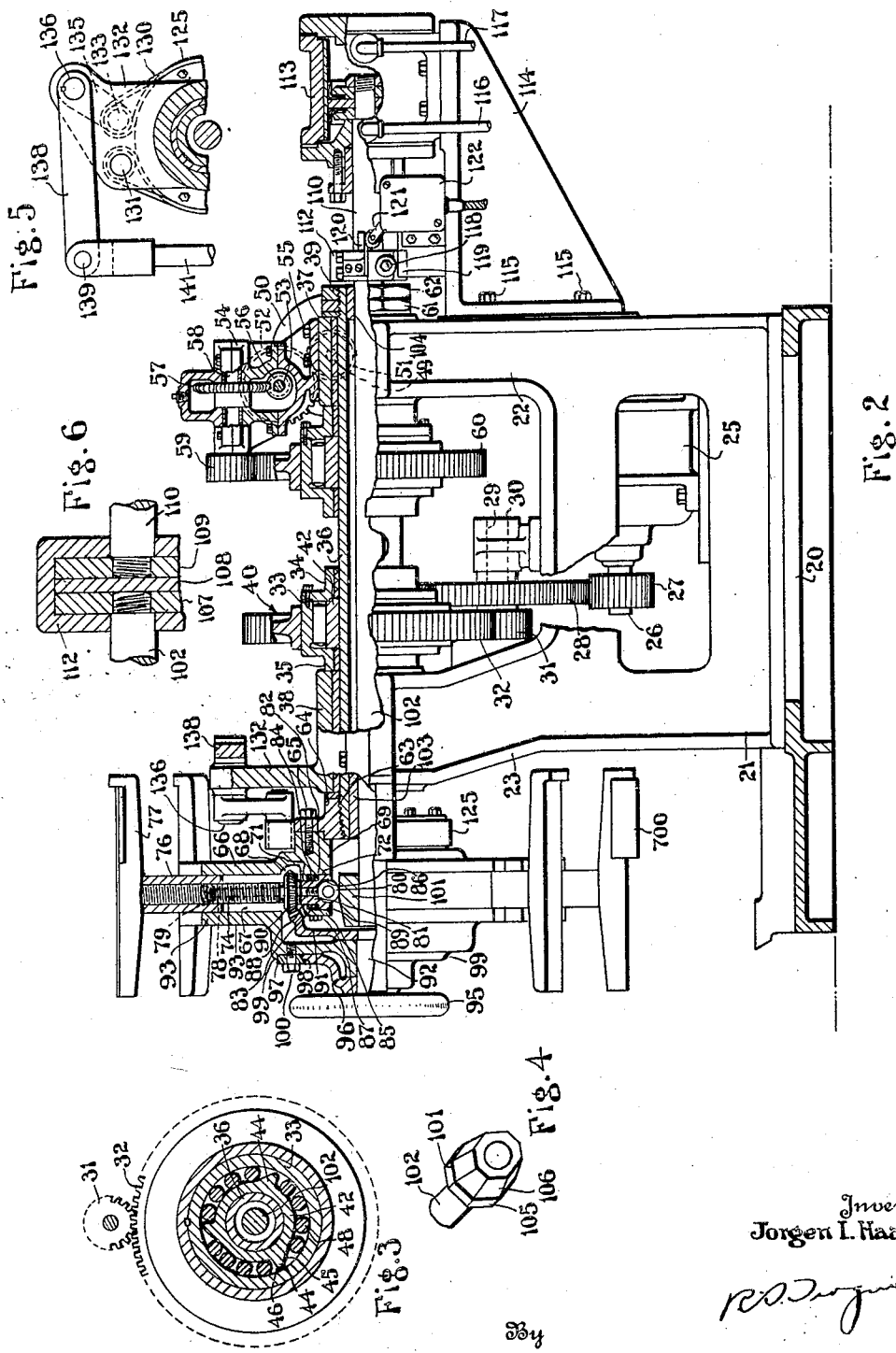

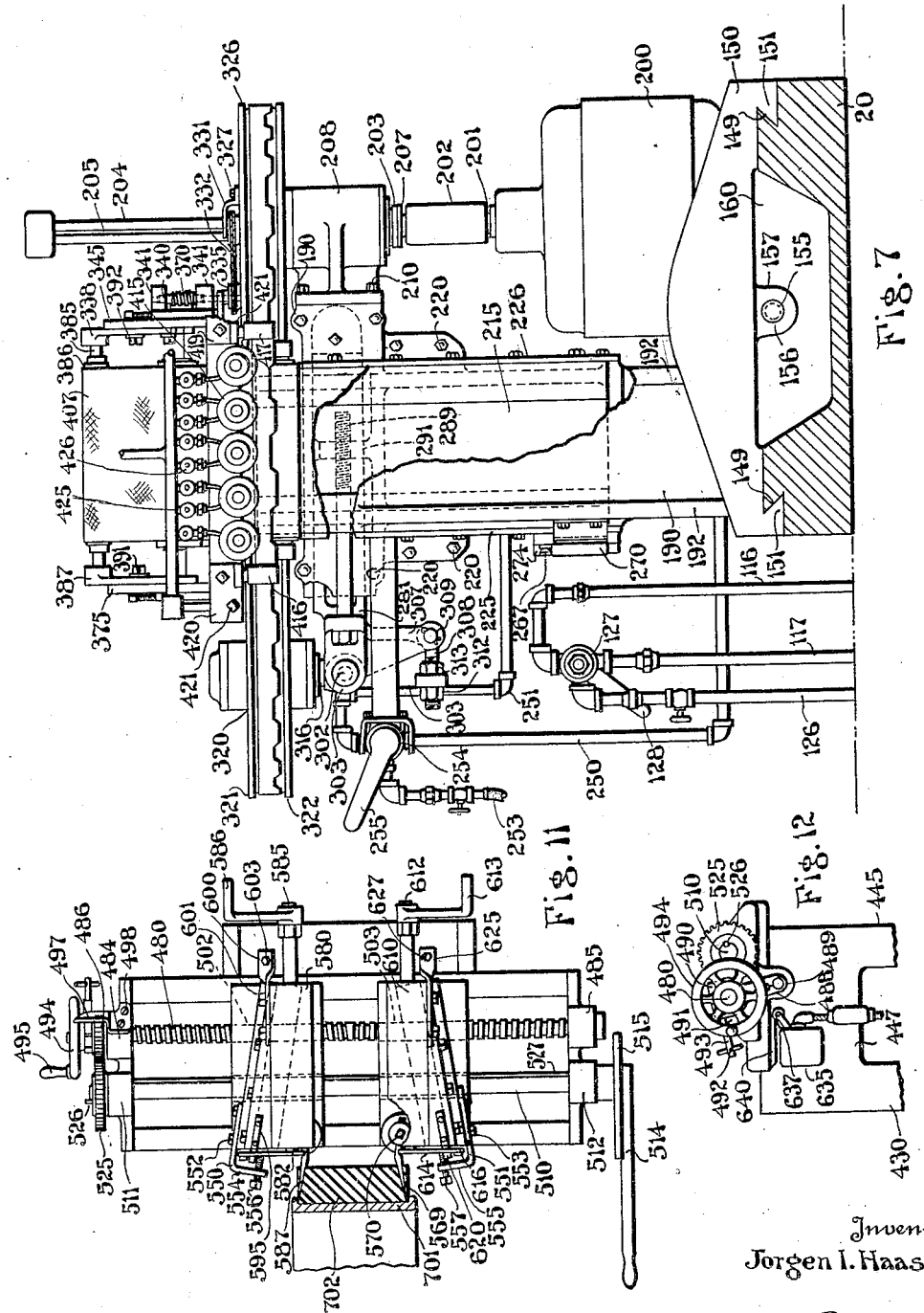

Oct. 18, 1932.  J. I. HAASE  1,883,729
TIRE TRIMMING MACHINE
Filed Sept. 21, 1928   5 Sheets-Sheet 5
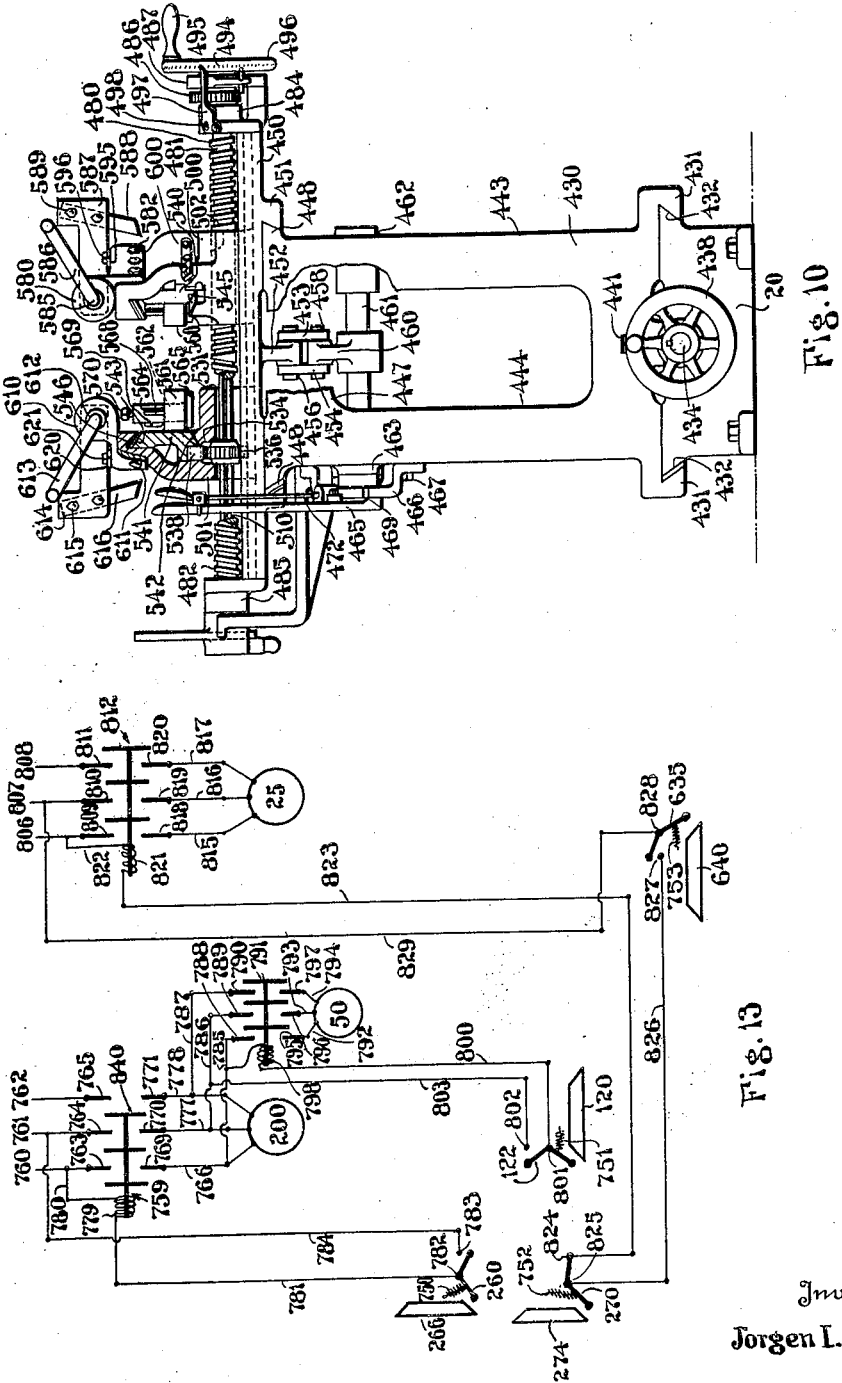
Inventor
Jorgen I. Haase
By
Attorney Patented Oct. 18, 1932

1,883,729

UNITED STATES PATENT OFFICE

JORGEN I. HAASE, OF AKRON, OHIO

TIRE TRIMMING MACHINE

Application filed September 21, 1928. Serial No. 307,363.

The invention relates to tire trimming machines, and it has particular relation to a machine of the above-designated character which shall especially be applicable for trimming solid or cushion rubber tires to predetermined dimensions.

An object of the invention is to provide a machine for trimming the rubber tread of a cushion or solid tire to predetermined dimensions following its assembly upon an annular base.

One of the most common methods employed in the manufacture of cushion and solid tires comprises the extrusion of unvulcanized rubber stock which, thereafter, is cut into strips of predetermined weight. The strips then are disposed in endless relation about annular base bands. It is well known by those skilled in the art, that the weighing and cutting of rubber to obtain a proper quantity for the construction of a tire is a very tedious and difficult operation and usually several attempts are made before a strip having the proper weight is secured.

According to this invention, the cutting and weighing of the rubber in exact quantities is dispensed with, and instead, the extruded rubber is cut into predetermined lengths each containing an excessive amount of rubber, which thereafter are wound about annular tire supporting bases. Following this operation the tread and side portions of the tire are trimmed to predetermined dimensions in order to obtain a desired volume of material on each base band. The machine employed for these purposes comprises essentially a rotary support for the tire supporting base band with the tire applied thereon, and a band saw which is operable transversely to the tire for severing or trimming excess material from the tread portion thereof. Other cutting or trimming devices likewise are embodied in the machine for trimming the sides of the tire to predetermined width.

For a better understanding of the invention, reference may now be had to the accompanying drawings, forming a part of the specification, of which:

Figure 1 is an elevational view of a machine constructed according to one embodiment of the invention;

Figure 2 is a cross-sectional view taken substantially along the line II—II of Figure 1;

Figure 3 is a view of one of the clutches employed between the rotary tire support and the motors.

Figure 4 is a perspective view of one end of a rod employed for expanding the tire supporting means;

Figure 5 is a view of the braking means employed, following de-energization of the driving motor, for stopping the rotation of the shaft on which a tire is supported;

Figure 6 is a cross-sectional view, on a larger scale, of the swivel connection employed between the tire support expanding rod and a rod forming part of a fluid operated reciprocating motor;

Figure 7 is a cross-sectional view, taken substantially along the line VII—VII of Fig. 1, of the mechanism employed for trimming the tread of a tire;

Figure 10 is an elevational view, partly in cross-section, showing the mechanism employed for trimming the sides of a tire;

Figure 11 is a plan view of the mechanism illustrated by Figure 9;

Figure 12 is a fragmentary elevational view taken from the right side of the portion of the machine illustrated by Fig. 10; and Figure 13 is a diagrammatical illustration of the electrical apparatus embodied in the machine.

Figure 8:
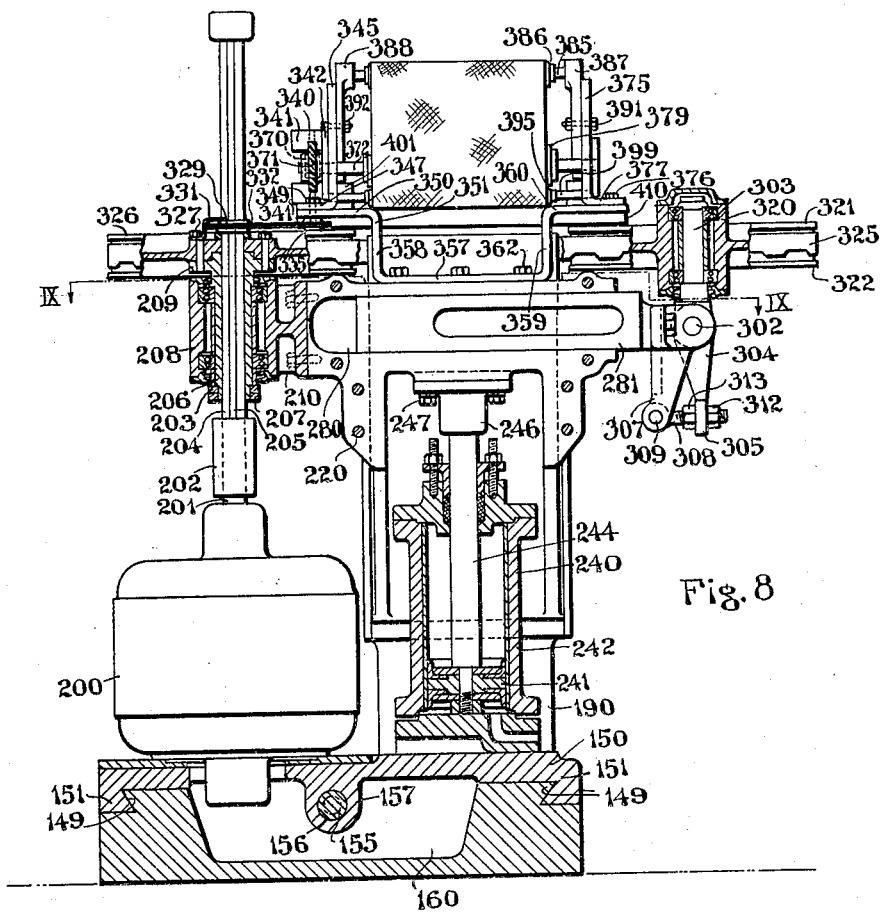
Figure 8 is a cross-sectional view of the tread trimming mechanism taken substantially along the line VIII—VIII of Fig. 1.

In practicing the invention, according to one of its several embodiments, an elongate base 20, intermediate its ends, supports a vertically disposed frame 21 having vertically disposed yoke members 22 and 23 projecting upwardly therefrom. A motor 25 supported on the base 20, adjacent the frame 21, is provided with a shaft 26 on which is rigidly secured a pinion 27 that meshes with a gear 28 rigidly mounted on a shaft 29 supported in a bearing bracket 30 on the frame 21 between the yoke members 22 and 23. A pinion 31, keyed to the outer end of the shaft 29 in turn, meshes with a relatively large gear 32 that is rigidly secured on a housing 33 of a roller clutch 40. This housing has an inwardly extending flange 35 on one side and a cap 34 bolted to its other, which flange and cap are journalled on an elongate hollow shaft 36. Spaced bearings 37 and 38, on the upper ends of the yoke members 22 and 23, respectively, support the ends of the shaft 36.

A sleeve 42, rigidly secured upon the shaft 36 between the cap 34 and the flange 35 (Fig. 3) is provided with circumferentially spaced teeth 44, each having corresponding radially directed surfaces 46 and substantially tangential surfaces 45. Roller bearings 48 are provided between the sleeve 42 and the housing 33 and in the present instance four of such bearings are disposed between each pair of the teeth 44.

When the gear 32 is rotated in a clockwise direction, referring to Figure 3, the rollers immediately adjacent the tangential surfaces 45 of the teeth 44 will be wedged between such surfaces and the inner periphery of the clutch housing 33, and will cause the gear 32 to drive the sleeve 42 and consequently the shaft 36 secured thereto. On the other hand, if the sleeve 42 alone is rotated in a clockwise direction, it will carry the roller bearings freely around the inner periphery of the clutch housing without imparting any rotary motion to the gear 32.

The shaft 36 also is adapted to be driven by a second motor 50, (Fig. 2) which is supported at one side of the yoke member 22. A pinion 51, keyed to the shaft 49 of this motor, meshes with a gear 52 rigidly secured on a shaft 53 which is journalled in a housing 54 mounted on the bearing 37 and secured thereto by stud bolts 55. Within the housing 54 the shaft 53 is provided with a worm 56, which meshes with a worm wheel 57 rigidly mounted on a transversely disposed shaft 58 also journalled in the housing 54. A pinion 59, keyed on one end of the shaft 58 externally of the housing 54, meshes with a relatively large gear 60 mounted upon a clutch 70, which is similar in construction to the clutch 40, associated, as hereinbefore described, with the shaft 36 and the gear 32.

The shaft 36 is retained in the bearings 37 and 38 by lock nuts 61 and 62 engaging the end thereof adjacent the bearing 37, and a centrally apertured circular plate 64 threaded on the opposite end of the shaft, as indicated at 63. The plate 64 adjacent its outer edge is secured by stud bolts 65 to a relatively large centrally apertured disc 66. On the opposite face of such disc, and adjacent the outer periphery thereof, radially disposed and equally spaced slots or channels 67 (eight being employed in the present instance) are provided. Adjacent its center the disc 66 is provided with a flange 69, and a relatively large circular recess 68 is formed between this flange and the inner ends of the slots 67. Radially disposed semi-circular openings 71, equal in number to the slots 67 provided in the flange 69, have their centers coinciding with the radial center lines of the slots. Inwardly of the openings 71, the flange 69 is provided with enlarged semi-circular openings 72, which have their centers in turn coinciding with the centers of the openings 71.

Longitudinally apertured screws 74 disposed in the slots 67 are threaded at their outer ends into internally threaded bosses 76, which are slidably disposed in the outer portions of the slots. These bosses have integral tire engaging jaws 77 on their outer ends.

At their inner ends, the screws 74 project into and are journalled in the openings 71. The ends of the screws abut blocks 81, disposed in the openings 72, and are secured to the latter by bolts 78, extending through apertures in the screws, and having heads 79 engaging the outer ends thereof. The blocks are provided with reduced portions 82, permitting their slidable movement in the openings 71, which are encircled by springs 83, abutting at one end the larger portions of the blocks 81, and at their other ends, shoulders 84 on the flange 69. In addition, each of the blocks 81, on its inner side, is provided with a semi-cylindrical recess 86 in which a roller 80 is disposed. A cap 85 employed on the outer side of the flange 69 and provided with semi-circular openings 88 and 89, supplementary to the aforesaid semi-circular openings 71 and 72 in the flange, respectively, is secured to the flange by stud bolts 87, in such position that it retains the screws 74 and the blocks 81 in proper positions.

The screws 74 adjacent their inner ends have integral bevel gears 90, disposed within the recess 68 in the disc 67, which mesh with a relatively large bevel gear 91, rigidly secured on a stud shaft 92, disposed in alignment with the shaft 36. This shaft is rotatably supported in a cover plate 93 that is secured to the disc 66 by bolts 94 (Figure 1). At its outer end the shaft 92 is provided with a hand wheel 95 and a dial 96 which slidably engages the front surface of the cover plate 93. The dial 96 and the cover plate 93 are provided with suitable indicia for facilitating the determination of the angular position or movement of the hand wheel. The operation of the hand wheel 95 results in the rotation of the gear 91 and, in turn, the bevel gears 90, thus rotating the screws 74 with respect to the bosses 76, and consequently effecting the inward or outward radial movement of the tire engaging jaws 77. A wedging member 97, disposed between an inclined surface 98 on the outer periphery of the dial 96, and a flange 99 on the cover, is secured by a bolt 100 projecting through the wedging member in order to prevent or to permit the rotation of the hand wheel.

The rollers 80, disposed in the openings 86 in the blocks 81, are adapted to traverse the surface of a cam 101, secured on the outer end of a rod 102, that is slidably supported in bushings 103 and 104 disposed in the opposite ends of the hollow shaft 36. This cam (Fig. 4), in the present instance, has eight surfaces indicated at 105, that are parallel to the axis of the rod 102, and a similar number of inclined surfaces 106 projecting inwardly therefrom. Longitudinal movement of the rod 102 with respect to the rollers 80 moves the blocks 81 against the action of the springs 83, thus displacing the jaws 77 by radial distances corresponding to the difference in slope at various points on the surfaces 105 of the cam 101.

At its opposite end, the rod 102 is connected to a plate 107 (Fig. 6) which abuts a spacing disc 108, disposed between such plate and a plate 109 secured to a second rod 110. The plates 107, 109, and the disc 108 are retained in abutting relation by a housing 112 comprising an upper part and a lower part bolted together as shown by Fig. 2 which permits rotation of the rod 102 with respect to the rod 110. The opposite end of the latter rod is secured to a reciprocating piston of a fluid motor 113, that is mounted on a bracket 114, secured by bolts 115 to the frame 21. Fluid under pressure for actuating the motor 113 is supplied by conduits 116 and 117 which are connected thereto on opposite sides of the piston. The conduits in turn are connected to a fluid supply conduit 126 (Fig. 7) by a valve 127 which is operated by a handle 128.

In order to prevent the housing 112 from rotating with the rods 102 and 110, rollers 118 are mounted on opposite sides thereof, which rollers engage brackets 119 extending vertically from the bracket 114. The housing 112 also is provided with a lug 120 that is adapted to engage an arm 121 forming part of a normally open electrical contact switch 122.

A brake 125 (Fig. 5) is provided in order to stop the shaft 36 from rotating following the de-energization of either of the motors 25 or 50. The brake comprises a band 130 that surrounds the outer peripheral surface of the plate 64 on the outer end of the shaft 36. This band is secured at one end to a pin 131 mounted on an integral upper extension 132 on the bearing 38, and at its other end is secured to a pin 133 extending from the lower end of an arm 135 that is keyed to a pin 136 which likewise is rotatably disposed in such extension. An arm 138, rigidly secured on the opposite end of the pin 136 is pivotally connected at its opposite end by a pin 139, to a vertically depending rod 141. At its lower end the last mentioned rod is adjustably secured to a foot pedal 142 (Fig. 1) which is pivoted intermediate its ends upon a pin 143, secured in a bracket 144 supported on the base 20.

One end of the base 20 slidably supports an auxiliary base 150 which is maintained thereon by gibs 151 engaging oppositely disposed guide surfaces 149 on the former. Movement of the auxiliary base, relative to the base 20, is effected by a screw 155 disposed in a longitudinally extending cavity 160 in the upper surface of the latter base, which projects through a threaded opening 156 in a lug 157 on the lower side of the auxiliary base. The screw 155 adjacent the end of the base 20 is journalled in a bearing 165 in the latter and is operated by a hand wheel 167, having a handle 168, which hand wheel is rigidly secured to the end of the screw. The outer periphery of the hand wheel 167 is provided with notches 170 that cooperate with a resilient finger 172 secured to the base 20, to indicate the degree of rotation of the hand wheel when the auxiliary base 150 is moved relative to the base 20. A clamp 175, adapted to retain the hand wheel firmly in a desired position against accidental movement thereof, is identical with a clamp provided and shown by Fig. 12, and will be described in relation to that figure.

On its upper surface the base 150 is provided with a pair of integral, vertically extending frame members 190 and 191 which are spaced longitudinally of the base. Vertically disposed webs 192, integral with both of the frame members and the base, are employed for reinforcing the frame members.

Figure 9:
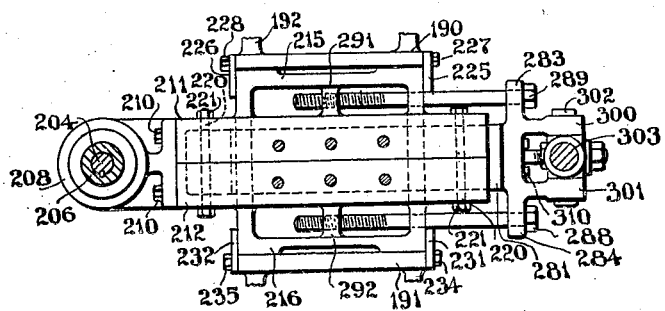
Figure 9 is a cross-sectional view taken substantially along the line IX—IX of Fig. 8.

The auxiliary base also supports a motor 200 having a vertically disposed shaft 201 which is connected by a coupling 202 to a second vertically disposed and relatively long shaft 204, having a key 205 extending throughout its length. A sleeve 206 slidable on the shaft 204, but keyed thereto, is rotatably supported in a bearing bracket 208 and is retained therein by a flange 209 on the upper end of the sleeve, and by nuts 203 and 207 threaded on its lower end. The bracket is secured by stud bolts 210 to the end of a pair of registering flanges 211 and 212 (Fig. 9) integral with the upper ends of a pair of slide members 215 and 216 respectively, that are disposed between the frame members 190 and 191, respectively. The upper and registering portions of the slide members 215 and 216 are secured together by a plurality of bolts 220 and nuts 221 whereas the lower portions abut the adjacent surfaces on the frame members 190 and 191. The slide member 215 is retained between the side edges of the frame member 190 by guide plates 225 and 226 bolted to the edges of the frame member by bolts 227 and 228, respectively, while the slide member 216 is retained between the side edges of the frame member 191 by guide plates 231 and 232 bolted to the edges of the frame member as indicated respectively at 234 and 235.

The slide members 215 and 216 are vertically reciprocated by a fluid pressure motor 240 (Fig. 8) which is mounted therebetween on the base 150. This motor comprises an ordinary reciprocating piston 241, slidably disposed in a cylinder 242 and joined to a piston rod 244, which rod in turn is secured at its upper end by a coupling 246 and bolts 247 to the lower side of the upper and registering portions of the slide members, 215 and 216. Fluid under pressure is transmitted to the motor 240 by conduits 250 and 251 (Fig. 7) which, through a valve 254, communicate with a fluid supply conduit 253. Operation of the valve 254 is effected by a handle 255.

Vertical reciprocation of the slide member 216 also is adapted to operate an electrical contact switch 260 which is bolted as indicated at 262 to the guide member 231. A cam 266, integral with the slide member 216, positively engages an operating arm 263 of the switch. Similarly, the reciprocation of the slide member 215 operates a switch 270, bolted to the guide member 225 by bolts 271, by means of a cam 274 integral with the slide member 215 which is adapted to engage an arm 261 of the switch. A laterally extending recess 280 is provided between the upper and registering portions of the slide members 215 and 216 which is open adjacent the end of such members opposite the bearing bracket 208. This recess slidably receives a bar 281 which, at its outer end, is provided with normally extending apertured ears 283 and 284 through which elongate bolts 288 and 289 project. The bolts have threaded inner ends which engage lugs 291 and 292 integral with the adjacent faces of the slide members 215 and 216, respectively. Other apertured ears 300 and 301 projecting outwardly from the end of the bar 281 receive within their apertures a horizontally disposed pin 302 which pivotally supports the lower end of a stud shaft 303. An arm 304, integral with the lower end of the shaft 303 and projecting in alignment therewith is provided at its lower end with an eye 305, which is adjustably connected to an arm 307 depending from the end of the bar 281, by an eye bolt 308. A pin 309 rigidly secured between a pair of lugs 310 at the lower end of the arm 307 pivotally supports one end of the eye bolt while the opposite end thereof is adjustably secured to the eye 305 of the shaft member 303 by nuts 312 and 313. The shaft 303 rotatably supports a pulley wheel 320 having flanges 321 and 322 on its outer periphery which retain an endless band saw 325 therebetween. The saw in turn is trained about a second pulley wheel 326 secured to the upper end of the sleeve 206 by bolts 327 which project through the wheel and into the flange 209.

A sprocket wheel 329, disposed above the pulley 326, and slidably mounted on the keyed shaft 204, is retained by a finger 331 secured on the pulley by one of the aforesaid bolts 327 in a position adjacent the pulley. Over this wheel a chain 332 is trained which engages a sprocket wheel 335 rigidly secured to a vertically disposed shaft 340. The latter is rotatably supported in horizontally disposed legs 341 of a bracket 342 bolted at its base to a vertically disposed angle plate 345. The angle plate in turn has an off-set outwardly extending portion 347 at its lower end which is secured by bolts 349 to a horizontal portion 350 of a frame 351. This frame is composed of a horizontally disposed intermediate portion 357, a pair of vertically disposed portions 358 and 359 projecting upwardly from the opposite ends thereof, and a pair of horizontally disposed portions 350 and 360 projecting outwardly from the upper end of the latter, respectively. The base portion 357 of the frame is secured to the top surfaces of the frame members 215 and 216 by bolts 362.

Intermediate its journalled ends the shaft 340, is provided with a worm 370 meshing with a worm wheel 371 secured to one end of a shaft 372, one end of which is journalled in the vertical portion of the plate 345 and the opposite end, in an angle plate 375 identical to the plate 345 but disposed oppositely thereto. The angle plate 375 has a portion 377 which is secured by bolts 376 to the portion 360 of the frame 351. A roller 379 is rigidly disposed on the shaft 372 between the plates 345 and 375. A second shaft 385 provided with a similar roller 386, has its ends journalled in the upper ends of arms 387 and 388, that are provided with slotted ends 390 (Fig. 1) through which bolts 391 and 392 project and adjustably secure the arms to the adjacent surfaces of the plates 345 and 375. Idling rollers 394 and 395 disposed in spaced relation to the rollers 379 and 386 and supported on shafts 398 and 399, respectively, are journalled in the ends of arms 400 and 401 rigidly secured by bolts 405 to the plates 345 and 375. A belt or conveyor 407 is trained over all of the aforesaid rollers in driven relation thereto.

A bar 410 secured to a vertically extending side portion 411 of the frame 351, rotatably supports a plurality of grooved discs 415 which engage the upper edge of the band saw and prevent its upward movement during its operation. Vertically disposed rollers 416 and 417, rotatably supported in blocks 419 and 420, secured by bolts 421, to the ends of the bar 410 engage the outer side of the band saw and maintain it in alignment with the grooves in the discs 415. A fluid supply conduit 425 also mounted on the bar 410 has individual nozzles 426 whose ends terminate adjacent the discs 415 for supplying a fluid to the band saw for facilitating the tire trimming operation.

A frame 430 is mounted on the ends of the base 20 opposite the auxiliary base 150 and like the base 150 it is provided with gibs 431 disposed on opposite sides of the base 20 which engage complementary guide surfaces 432 thereon. Slidable movement of the frame 430 relative to the base 20, is effected by a screw 434 threaded into an apertured lug 435 integral with the lower side of the frame and which adjacent its outer end is journalled in a bearing 437 on the base. A hand wheel 438 rigidly secured to the outer end of the screw 434 for operating the latter is provided with notches 439 on its periphery that are adapted to be engaged by a finger 441 to govern the rotary movement of the hand wheel. The screw 434 also is provided with a clamping device 442, similar to that employed by the wheel 167, which serves to lock the wheel relative to the base 20.

The frame 430 is composed of four vertically projecting legs 443, 444, 445 and 446 which are joined at their upper ends by web members 447. At its upper end, the frame is provided with horizontally disposed guides 448, extending longitudinally relative to the base 20, upon which a carriage 450 is slidably supported by means of gibs 451. Movement of the carriage 450 relative to the frame 430 is effected by an arm 452 integral with the carriage and projecting therebeneath centrally of the webs 447 of the frame. The arm is connected to links 453 and 454 by a pin 456 journalled in an opening in the arm and projecting through apertures in the upper ends of the links. Apertures formed in the opposite ends of the links 453 and 454 receive a second pin 458 which is journalled therebetween in the free end of a crank arm 460 formed integral with a shaft 461 journalled in bearings 462 and 463 in the upper ends of the frame legs 443 and 444, respectively. Operation of the shaft 461 is effected by a hand lever 465 secured to one end thereof and disposed on the outer side of the frame 430. In order to retain the hand lever 465 in either of two limited positions, a segment 466 secured by bolts 467 to the outer side of the frame 430, adjacent the lever 465, has a pair of spaced notches 469 and 470 which are adapted to be engaged by the lower end of a latch rod 472 slidably and resiliently mounted longitudinally on the hand lever.

A screw 480 mounted transversely with respect to the carriage 450 and disposed above the upper surface thereof, has its ends journalled in bearings 484 and 485 on the opposite sides of the carriage. This screw has one half of its length threaded in one direction as indicated at 481, and its other half threaded in an opposite direction, as indicated at 482. The outer end of the screw adjacent the bearing 484 has a pinion 486, rigidly secured thereon, and outwardly of the pinion, a clamp 487, adapted to secure the screw in any adjusted position. As best shown by Fig. 12, the clamp 487 comprises a forked member 488 secured at its end opposite the fork, to a pin 489 on the carriage 450. Spaced arms 490 and 491 comprising the fork, have complementary and adjacent semi-cylindrical recesses (not shown) adapted to be clamped about a cylindrical portion of the screw 480. Movement of the arms 490 and 491 relative to each other is effected by a screw member 492 which has an enlarged outer cylindrical portion 493 abutting the end of the arm 491 and a reduced threaded portion which loosely projects through an opening in the arm 491 and is threaded into an opening in the arm 490.

The extreme outer end of the screw is provided with a hand wheel 494 and a handle 495 by which it is manually operated. The outer periphery of the wheel has a plurality of notches 496 adapted to be engaged by a finger 497 secured by screws 498 to a portion of the bearing 484. A pair of crossheads 500 and 501 having internally threaded and laterally extending openings 502 and 503 respectively are mounted on the threaded portions 481 and 482 of the screw respectively, and are adapted to be moved relative to each other by rotation of the screw 480 by the hand wheel 494.

A second shaft 510 (Figs. 1 and 11) disposed parallel to the screw 480 but spaced therefrom toward the opposite end of the base 20 is journalled in bearings 511 and 512, disposed on opposite sides of the carriage 450 adjacent the bearings 484 and 485 respectively. The outer end of this shaft adjacent the bearing 512, is provided with a rigidly secured operating handle 514 by means of which the shaft 510 may be turned. A segment 515 rigidly secured to the inner side of the handle at the inner end of the latter is provided in its outer portion with a radially disposed slot 517. When the handle is in a position substantially 180 degrees removed from its position shown by Fig. 1, the slot 517 is substantially aligned with a lug 518 integral with the outer end of a bracket 519 secured by bolts 520 to the frame 430. Hence with the segment 515 in the latter position the notch 517 is adapted to receive the lug 518 upon movement of the carriage 450 relative to the frame 430.

The opposite end of the shaft 510 is provided with a pinion 525 (Fig. 11) which may be rigidly secured to the shaft by a key 526 or be free to rotate relative to the shaft upon removal of the key. This pinion meshes with the pinion 486 disposed on the end of the screw 480.

The shaft between the bearings 511 and 512 is provided with a key 527 extending the entire length of this portion of the shaft, which projects through a relatively large opening 531 (Fig. 10) in each of the cross-heads 500 and 501. The opening in the cross-head 501 is enlarged as indicated at 534 to receive a pinion 536 which is mounted on the shaft 510 for rotation therewith but capable of slidable movement relative thereto. This pinion meshes with a rack 538, which is disposed at an angle to the plane of the pinion 536, although the teeth on its lower side are disposed in parallel relation to teeth in the pinion. The rack is mounted on the lower side of a carriage 541 which has inclined guide surfaces 542 and 543, which engage gibs 545 and 546 on the cross-head. These guide surfaces and the gibs also are disposed parallel to the rack 538. Movement of the carriage relative to the cross-head in a direction toward the opposite end of the base 20, is adjustably limited by an angle bracket 551 (Fig. 11) secured by bolts 553 to the outer side of the cross-head. A portion 555 projecting normally to the base of the bracket is provided with a screw 557 projecting into the path of movement of the carriage.

The carriage 541 at one side thereof is provided with a boss 561 having a vertically disposed aperture as indicated at 562, through which a pin 564 projects. This pin has an enlarged head 565 on its lower end abutting the lower side of the boss and a vertically extending, diametrically disposed, slot 568 in which a knife 569 is slidably mounted. The knife is secured in the slot against the upper surface of the boss by a set screw 570 threaded into an opening, extending downwardly in the upper end of the pin 564, the lower end of which is adapted to abut the upper edge of the knife.

The opening 531 (not shown), in the cross-head 500, like the opening in the cross head 501, is enlarged intermediate its ends, and a pinion is disposed in this enlarged portion of the opening, which is identical with the pinion 536. This pinion meshes with a rack identical with the rack 538, which is secured to the lower side of a carriage 540 slidably disposed on the cross-head 500 and retained thereon in the same manner as the carriage 541 is slidably disposed and retained on the cross-head 501. The carriage 540 also supports an apertured boss 560 on its side adjacent the carriage 541, in the aperture of which a pin similar to the pin 564 is mounted. A knife identical to the knife 569 and projecting through a diametrical slot in the pin, above the boss, is retained therein by a set screw engaging the upper end of the pin, and the knife. The carriage 540 and the rack thereon, are slidable in the cross-head 500 at an angle to the planes of the pinions mounted on the shaft 510, but in a direction opposite to the direction in which the carriage 541 is movable, and in a diverging relation thereto. Similarly, the cross-head 500 has an angle bracket 550 secured by bolts 552 to the outer side thereof, which has a portion 554 through which a screw 556 projects into the path of movement of the carriage, in order to limit the movement of the latter toward the opposite end of the base 20.

Above the carriage 541, the cross-head 501 is provided with a bearing bracket 610 extending parallel to the plane of the pinion 536 and secured by bolts 611 to its upper surface. A shaft 612 journalled in the bracket is relatively longer than the bearing portion thereof, and hence may be moved longitudinally relative thereto. On one end the shaft has a crank 613 and on its other an arm 614, carrying a knife 616 secured thereto by bolts 615. The arm 614 normally is retained in its position shown by Fig. 10 by a bar 620, bolted to the bearing bracket as indicated at 621, which has an end normally disposed beneath the arm 614 and in contact therewith. Movement of the crank 613 in a counter-clockwise direction is limited by a bar 625, secured by bolts 626 to the cross-head 501, which has a set screw 627 disposed in the path of movement of the crank 613 when the arm 614 is clear of the bar 620.

Like the cross-head 501, the cross-head 500 also is provided with a bearing bracket 580 secured thereto by bolts 582. A shaft 585 journalled in the bracket and relatively longer than the bearing, has a crank 586 on one end, and an arm 587 on its other, which is provided with a blade 588 secured thereto by bolts 589. The arm 587 normally is retained in its position shown by Fig. 10, by a bar 595 secured by bolts 596 to a portion of the bearing bracket 580 and normally projecting below the arm and in contact therewith. The latter however, by moving the shaft longitudinally with respect to the bracket, may be moved relative to the shaft 585 in order to clear the arm from the end thereof and permit its rotation with the shaft. The cross-head 500 adjacent the crank 586, is provided with a bar 600 secured thereto by bolts 601, which, at its outer end, has an adjustable set screw 603 projecting therethrough. This set screw is disposed in the path of movement of the crank 586 when the shaft 585 is in such position that the arm 587 is clear of the bar 596, and is adapted to limit the clock-wise movement of the crank.

Movement of the carriage 450 relative to the frame 430 also operates an electrical contact switch 635 secured to the side of the frame 430 adjacent the hand wheel 496, and which has a switch arm 637 in the path of movement of a switch operating cam 640 secured to the under side of the carriage 450 adjacent the hand wheel.

Fig. 13 discloses a diagram of the electrical circuits provided for automatic operation of the motors 25, 50 and 200 employed for driving the tire supporting chuck and the band saw 325 respectively. Electrical conductors 760, 761 and 762 connected to main electrical supply conductors, lead to terminals 763, 764 and 765 of a three-pole switch 759. Other conductors 766, 777 and 778 respectively connect the opposite terminals 769, 770, 771 of the switch to the terminals of the motor 200. The bridging element 840 adapted to connect the corresponding terminals of the switch 759 is operated by a solenoid 779 which has one terminal connected by a conductor 780 to the conductor 760 and its other terminal connected by a conductor 781 to one terminal 782 of the single-pole switch 260 which normally is maintained open by a spring 750. The other terminal 783 of the switch 260 is connected by a conductor 784 to the conductor 761. The switch 260, which is operated by the downward movement of the bar 266 on the frame member 191 completes a circuit through the solenoid 779, which in turn closes the three-pole switch 759 and thus energizes the motor 200.

The conductors 766, 777 and 778 also are connected respectively by conductors 785, 786 and 787 to terminals 788, 789, 790 of a three-pole switch 791. The motor 50 is connected by conductors 792, 793 and 794 to the other terminals 795, 796, 797 of the switch. Operation of the switch 791 is effected by a solenoid 798, one terminal of which is connected to the conductor 785 and the other terminal by a conductor 800 to one terminal 801 of a switch 122 normally maintained open by a spring 751. The other terminal 802 of the latter switch is connected by a conductor 803 to the conductor 786. When the three-pole switch 759 and the switch 122 are closed, the solenoid 798 is energized, thus closing the three-pole switch 791 and completing a circuit through the motor 50.

Other conductors 806, 807 and 808 connected to a source of electrical current lead to terminals 809, 810, 811 of a three-pole switch 812. Conductors 815, 816 and 817 connect the opposite terminals 818, 819, 820 of the switch 812 to the motor 25. The switch 812 is operated by a solenoid 821, one terminal of which is connected by a conductor 822 to the conductor 806 while the other terminal is connected by a conductor 823 to one terminal 824 of a switch 270 normally maintained closed by a spring 752. The other terminal 825 of the latter switch is also connected by a conductor 826 to a terminal 827 of a switch 635 normally maintained open by a spring 753, while the other terminal 828 of the latter switch is connected by a conductor 829 to the conductor 807. With the switch 270 closed, movement of the cam 640 against the switch 635 completes a circuit through the solenoid 821, thus closing the three-pole switch 812 and thereby causing energization of the motor 25.

In the operation of the machine described, initially the jaws of the tire supporting chuck are contracted, that is, the rollers 80 are at rest adjacent the inner ends of the inclined surfaces 106 of the cam 101. Blocks 700 are now disposed on the outer peripheral surfaces of the jaws 77 whereafter a tire base 701 having an extruded ring of rubber 702 thereon, is mounted on such blocks. Rotation of the hand wheel 95 moves the jaws 77 radially outwardly until the blocks 700 firmly engage the inner periphery of the base band. The position of the hand wheel is now noted whereafter it is loosened sufficiently to permit removal of the blocks 700 from between the base band of the tire and jaws 77. The thickness of the blocks in a radial direction is such that when removed, movement of the cam 101 thereafter to its position shown by Fig. 2 in which position the surfaces 105 are in contact with the rollers 80, firmly engages the jaws 77 directly with the inner periphery of the base band 701. Movement of the cam 101 and the rod 102 also results in the closing of the switch 122 as has been previously described.

The band saw mechanism is now adjusted toward the tire in predetermined distances by movement of the hand wheel 167. These distances may be varied according to the thickness of tread to be trimmed from the tire. Following this adjustment the mechanism is moved vertically downwardly by operation of the fluid motor 240 to a position in which the saw is disposed in a horizontal plane substantially coinciding with the axis of the tire support. Movement of the band saw mechanism downwardly causes energization of the motor 200 by reason of the fact that the cam 266 closes the switch 260 which completes a circuit through the solenoid 779, which in turn closes the three-pole switch 759 and thus completes a circuit from the conductors 760, 761 and 762 to the motor. Since the switch 122 is closed owing to the position of the cam 101 and rod 102, as previously referred to, closing of the switch 759 also completes a circuit through the solenoid 798 which results in the closing of the switch 791 and energization of the motor 50. Energization of the motor 200 results in operation of the band saw 325 about the pulleys 320 and 326, whereas energization of the motor 50 results in rotation of the tire supporting chuck at its lower rate of speed. The downward movement of the band saw mechanism also brings the band saw into an operative position with respect to the rotating tire and the tread is trimmed from the latter.

Following the trimming of the tread the band saw mechanism is returned to its inoperative position which movement permits the switch 260 to open thus de-energizing the solenoid 779, opening of the switch 759, and de-energizing the motors 200 and 50.

The hand lever 465 is now moved from its lower to its upper position which movement affects a movement of the carriage 450 and the closing of the switch 635 by the bar 640. Since the band saw mechanism is in its upper position, the cam 274 thereon is free from contact with the switch 270 and consequently the latter is closed. With the switches 270 and 635 closed, a circuit is completed through the solenoid 821 which results in closing of the three-pole switch 812 and energization of the motor 25. At this time or prior to the movement of the hand lever 465 the knives 569 are adjusted with respect to their supports and thereafter the hand wheel 494 is operated to adjust the cross-heads 500 and 501 to predetermined positions. Depending upon the angle at which the sides of the tire are to be trimmed, the key 526, which causes operative engagement of the pinion 484 on the screw 480 with the pinion 525 on the shaft 510, is either removed or retained in position. The hand lever 514 is now moved to the position shown by Figure 1. The knives 569 during the movement of the lever 514 progressively trim the edges of the tire approximately to the rim. Thereafter the lever 514 is moved to its former position and the shafts 585 and 612 are moved longitudinally until the arms 587 and 614 are beyond the plates 595 and 620. By means of the cranks 586 and 613 the arms are rotated in opposite directions and the knives move against the sides of the tire adjacent the base thus severing the strips previously cut by the knives 569. Following this operation the shafts 585 and 612, and the lever 465 are moved to their inoperative positions. The trimmed tire is now released from the jaws 77 by movement of the rod 102 and the cam 101 by means of the fluid motor 113 after which it is removed from the machine. Movement of the hand lever 465 and the carriage 450 also affects an opening of the switch 635 and therefore a de-energization of the motor 25.

From the foregoing description it is apparent that a machine has been provided for trimming tires to predetermined dimensions which obviates the practice of cutting and weighing all extruded stock before applying it on a tire supporting base band. It is apparent also that a machine has been provided which is adaptable to any size tire and which is capable of trimming a tire to any dimensions required.

Although I have illustrated only the preferred form which the invention may assume and have described that form in detail, it will be apparent to those skilled in the art that the invention is not so limited, but that various modifications may be made therein without departing from the spirit of the invention or from the scope of the appended claims.

What I claim is:—

1. A machine for trimming a tire comprising a rotatable support for the tire, means for rotating the support, a mechanism for trimming an outer peripheral portion of the tire and movable to and from operative positions relative to the tire, means for moving said mechanism, and motor control means in the path of movement of the mechanism for controlling the rotating means for the support.

2. A machine for trimming a tire comprising a rotatable support for the tire, means for rotating the support, a mechanism for trimming an outer peripheral portion of the tire and including a motor, said mechanism being movable to and from operative positions relative to the tire, means for moving said mechanism, and motor control means in the path of movement of the mechanism.

3. A machine for trimming a tire comprising a rotatable support for the tire, means including a motor for rotating the support, a mechanism for trimming the outer peripheral portion of the tire, and including a motor, said mechanism being movable to and from operative positions relative to the tire, means for moving the mechanism, and motor control means in the path of movement of said mechanism.

4. A machine for trimming a tire comprising a rotatable support for the tire, selective motors for rotating the support, mechanism for trimming the tread portion of the tire, said mechanism also being adapted to be operated while one of said motors is in operation, means for trimming the sides of the tire, and adapted to be operated while the other motor is in operation, means for moving the tread trimming mechanism, and motor control means in the path of movement of said mechanism.

5. A machine for trimming a tire comprising a rotatable support for the tire, selective motors for rotating the support, mechanism for trimming the tread portion of the tire and including a motor, said mechanism being movable to and from operative positions relative to the tire and adapted to be operated while one of said selective motors is in operation, means for trimming the sides of the tire and adapted to be operated, while the other selective motor is in operation, means for moving the tread trimming mechanism, and motor control means in the path of movement of said mechanism.

6. A machine for trimming a tire comprising a rotatable support for the tire, means for rotating the support, a mechanism for trimming an outer peripheral portion of the tire, said mechanism including a plurality of pulleys, an endless cutting member trained over the pulleys, and means for rotating the pulleys to operate the cutting member.

7. A machine for trimming a tire comprising a rotatable support for the tire, means for rotating the support, a mechanism for trimming an outer peripheral portion of the tire, said mechanism including a plurality of pulleys, an endless cutting member trained over the pulleys, and means for rotating the pulleys to operate the cutting member, said cutting member operating in a direction transversely of the plane of rotation of the tire.

8. A machine for trimming a tire comprising a rotatable support for the tire, means for rotating the support, a mechanism for trimming an outer peripheral portion of the tire, said mechanism including a plurality of pulleys, and endless cutting member trained over the pulleys, means for rotating the pulleys to operate the cutting member, and means for adjusting said pulleys relatively.

9. A machine for trimming a tire comprising a rotatable support for the tire, means for rotating the support, a mechanism for trimming an outer peripheral portion of the tire, said mechanism being mounted on a vertically slidable member in said support, and means for moving said member.

10. A machine for trimming a tire comprising a rotatable support for the tire, means for rotating the support, a mechanism for trimming an outer peripheral portion of the tire, said mechanism being mounted on a vertically slidable member in said support, and means for moving said member, said last mentioned means including a fluid operated motor operatively connected to the member.

11. In a machine for trimming tires, a base having an upwardly extending rotatable shaft thereon, a member vertically slidably mounted on said base and loosely receiving the shaft, means for vertically moving said member, a pair of spaced pulleys mounted rotatably on said member, one of the pulleys being feather keyed onto the shaft, an endless tire trimming member trained about the pulleys, and means for rotating the shaft.

12. In a machine for trimming tires, a base comprising a stationary portion and a laterally movable portion, means for adjustably moving the movable portion of the base relative to the stationary portion, a rotatable shaft extending upwardly from the movable portion of the base, a member vertically slidably mounted on the movable portion of the base and loosely receiving the shaft, means for vertically moving said member, spaced pulleys mounted rotatably on said member, one of the pulleys being keyed onto the shaft, an endless tire trimming member trained about the pulleys, and means for rotating the shaft.

13. In a tire trimming machine, a base comprising a stationary portion and a laterally movable portion, means for moving said movable portion of the base, a member vertically slidably mounted on the base, means for moving said slidable member, a tire trimming mechanism mounted on said member, and means for operating said mechanism.

14. A machine for trimming a tire comprising a rotatable support for the tire, means for rotating the support, a mechanism for trimming an outer peripheral portion of the tire, said mechanism including a plurality of pulleys, an endless cutting member trained over the pulleys, means for rotating the pulleys to operate the cutting member, and conveyor means operating simultaneously with the cutting mechanism for conveying away the strips of rubber cut from the tire.

15. In a machine for trimming tires, a base comprising a stationary portion and a laterally movable portion, means for adjustably moving the movable portion of the base relative to the stationary portion, a plurality of pulleys rotatably mounted on the movable portion, an endless tire trimming member trained about the pulleys and means for operating the pulleys and trimming member.

In witness whereof, I have hereunto signed my name at Akron, in the county of Summit and State of Ohio, U. S. A., this 20th day of September, 1928.

JORGEN I. HAASE.